United States Patent
Greevy

(10) Patent No.: US 11,856,001 B2
(45) Date of Patent: *Dec. 26, 2023

(54) METHOD FOR SECURELY COMMUNICATING EMAIL CONTENT BETWEEN A SENDER AND A RECIPIENT

(71) Applicant: Paubox, Inc., San Francisco, CA (US)

(72) Inventor: Hoala Greevy, San Francisco, CA (US)

(73) Assignee: Paubox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/842,347

(22) Filed: Jun. 16, 2022

(65) Prior Publication Data

US 2022/0321577 A1    Oct. 6, 2022

Related U.S. Application Data

(63) Continuation of application No. 17/014,905, filed on Sep. 8, 2020, now Pat. No. 11,399,032, which is a
(Continued)

(51) Int. Cl.
*H04L 9/40*    (2022.01)
*H04L 51/212*    (2022.01)

(52) U.S. Cl.
CPC .......... *H04L 63/123* (2013.01); *H04L 51/212* (2022.05); *H04L 63/0236* (2013.01);
(Continued)

(58) Field of Classification Search
CPC ... H04L 63/123; H04L 51/12; H04L 63/0236; H04L 63/0281; H04L 63/0428; H04L 63/1408; H04L 63/168
See application file for complete search history.

(56) References Cited

U.S. PATENT DOCUMENTS 7,305,545 B2 * 12/2007 Filipi-Martin ........ H04L 9/3247
709/203
7,620,690 B1 * 11/2009 Castelli ................... H04L 51/12
709/206
(Continued)

FOREIGN PATENT DOCUMENTS

WO    WO-2009010767 A1 *    1/2009    ............. H04L 12/58

*Primary Examiner* — Shahriar Zarrineh
(74) *Attorney, Agent, or Firm* — Run8 Patent Group, LLC; Peter Miller; Leah Raddatz

(57) ABSTRACT

One variation of a method for end-to-end encryption of electronic mail includes: receiving an email encrypted according to a first encryption protocol and designating a recipient within an external domain; verifying encryption protocol supported by the recipient's mail client; in response to a recipient exclusion database identifying the recipient, encrypting the email to a less-robust encryption protocol supported by the recipient mail client and transmitting the email to the !recipient; in response to the recipient exclusion database excluding the recipient and the recipient mail client supporting the first encryption protocol, transmitting the email encrypted according to the first encryption protocol to the recipient; and, in response to the recipient exclusion database excluding the recipient and the recipient mail client not supporting the first encryption protocol, generating a notification email including a hyperlink to a secure webpage containing content of the email and transmitting the notification email to the recipient.

20 Claims, 6 Drawing Sheets

Related U.S. Application Data continuation of application No. 15/683,246, filed on Aug. 22, 2017, now Pat. No. 10,805,311.

(60) Provisional application No. 62/378,068, filed on Aug. 22, 2016.

(52) U.S. Cl.
CPC ...... *H04L 63/0281* (2013.01); *H04L 63/0428* (2013.01); *H04L 63/1408* (2013.01); *H04L 63/168* (2013.01)

(56) References Cited

U.S. PATENT DOCUMENTS

| | | | | |
|---|---|---|---|---|
| 7,774,411 B2 * | 8/2010 | LeMay | .................. | H04L 63/126 709/206 |
| 8,806,190 B1 * | 8/2014 | Munshi | .............. | H04L 63/0428 713/153 |
| 9,781,083 B2 * | 10/2017 | Munshi | .............. | H04L 63/0428 |
| 2002/0169954 A1 * | 11/2002 | Bandini | .................. | H04L 51/12 713/153 |
| 2003/0088766 A1 * | 5/2003 | Engel | .................... | H04L 63/061 713/150 |
| 2004/0243837 A1 * | 12/2004 | Fredette | .............. | H04L 63/0471 709/206 |
| 2005/0010448 A1 * | 1/2005 | Mattera | .................. | G06Q 10/10 705/2 |
| 2006/0075228 A1 * | 4/2006 | Black | .................... | H04L 63/104 713/167 |
| 2006/0101124 A1 * | 5/2006 | Landis | ................. | G06Q 10/107 709/206 |
| 2007/0005713 A1 * | 1/2007 | LeVasseur | ............ | H04L 63/123 709/206 |
| 2007/0022162 A1 * | 1/2007 | Thayer | ................ | H04L 63/0428 709/206 |
| 2007/0083749 A1 * | 4/2007 | Fang | .................... | H04L 63/0823 713/152 |
| 2007/0130464 A1 * | 6/2007 | Swedor | ............... | H04L 63/0823 713/170 |
| 2008/0165972 A1 * | 7/2008 | Worthington | ........... | H04L 51/00 380/278 |
| 2008/0168026 A1 * | 7/2008 | Patil | ...................... | G06Q 10/107 |
| 2008/0307077 A1 * | 12/2008 | Langoulant | ........... | H04L 51/066 709/222 |
| 2009/0070866 A1 * | 3/2009 | Erikson | ................. | H04L 63/126 726/14 |
| 2009/0157823 A1 * | 6/2009 | Price, III | ................ | H04L 51/14 726/1 |
| 2009/0327714 A1 * | 12/2009 | Yaghmour | .............. | H04L 51/30 713/168 |
| 2010/0124332 A1 * | 5/2010 | Arena | .................... | H04L 9/3226 380/270 |
| 2011/0191664 A1 * | 8/2011 | Sheleheda | ............... | G06F 17/00 709/224 |
| 2011/0202756 A1 * | 8/2011 | West | .................... | H04L 63/0428 713/152 |
| 2012/0148044 A1 * | 6/2012 | Fang | ..................... | H04L 63/205 380/255 |
| 2013/0019104 A1 * | 1/2013 | Halas | .................. | G06F 21/6227 713/189 |
| 2013/0080775 A1 * | 3/2013 | Liebmann | ........... | H04L 63/0471 713/168 |
| 2014/0020044 A1 * | 1/2014 | Ayres | .................... | G06F 21/6209 726/1 |
| 2015/0143118 A1 * | 5/2015 | Sheller | ...................... | H04L 9/14 713/168 |
| 2016/0070905 A1 * | 3/2016 | Antoun | .................. | G06F 21/6209 726/1 |
| 2016/0212082 A1 * | 7/2016 | Bhavnani | ........... | H04L 63/0414 |
| 2017/0222989 A1 * | 8/2017 | Morrison | .......... | H04L 63/0471 |
| 2021/0409424 A1 * | 12/2021 | Seshadri | ............. | H04L 63/0428 |

* cited by examiner

IF [EMAIL ENCRYPTION CIPHER] ∈ {SUPPORTED ENCRYPTION LIST}:

METHOD FOR SECURELY COMMUNICATING EMAIL CONTENT BETWEEN A SENDER AND A RECIPIENT

CROSS-REFERENCE TO RELATED APPLICATIONS

This Application is a continuation application of U.S. patent application Ser. No. 17/014,905, filed on 8 Sep. 2020, which is a continuation application of U.S. patent application Ser. No. 15/683,246, filed on 22 Aug. 2017, which claims the benefit of U.S. Provisional Application No. 62/378,068, filed on 22 Aug. 2016, which are both incorporated in their entireties by this reference.

TECHNICAL FIELD

This invention relates generally to the field of email communications and more specifically to a new and useful method for securely communicating email content between a sender and a recipient in the field of email communications.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

As shown in FIGS. 1A-1F, a method S100 for securely communicating email content between a sender and a recipient includes: receiving an email encrypted according to a first encryption protocol in Block S110, the email sent by a sender at a first domain and designating a recipient address within a second domain; and verifying encryption protocols supported by a recipient mail client at the recipient address in Block S120. The method S100 also includes, in response to a recipient exclusion database identifying the recipient address: encrypting the email to a second encryption protocol less robust than the first encryption protocol and supported by the recipient mail client in Block S140; and transmitting the email encrypted according to the second encryption protocol to the recipient address in Block S142. The method S100 further includes, in response to the recipient exclusion database excluding the recipient address and in response to a maximum encryption level supported by the recipient mail client exceeding the first encryption protocol: encrypting the email to a third encryption protocol exceeding robustness of the first encryption protocol in Block S150; and transmitting the email encrypted according to the third encryption protocol to the recipient address in Block S152. The method S100 also includes, in response to the recipient exclusion database excluding the recipient address and the recipient mail client supporting the first encryption protocol, transmitting the email encrypted according to the first encryption protocol to the recipient address in Block S160. Furthermore, the method S100 includes, in response to the recipient exclusion database excluding the recipient address and encryption protocols supported by the recipient mail client excluding the first encryption protocol: generating a notification email comprising a hyperlink to a secure webpage containing content of the email in Block S170; and transmitting the notification email to the recipient address in Block S172.

Figure 2:
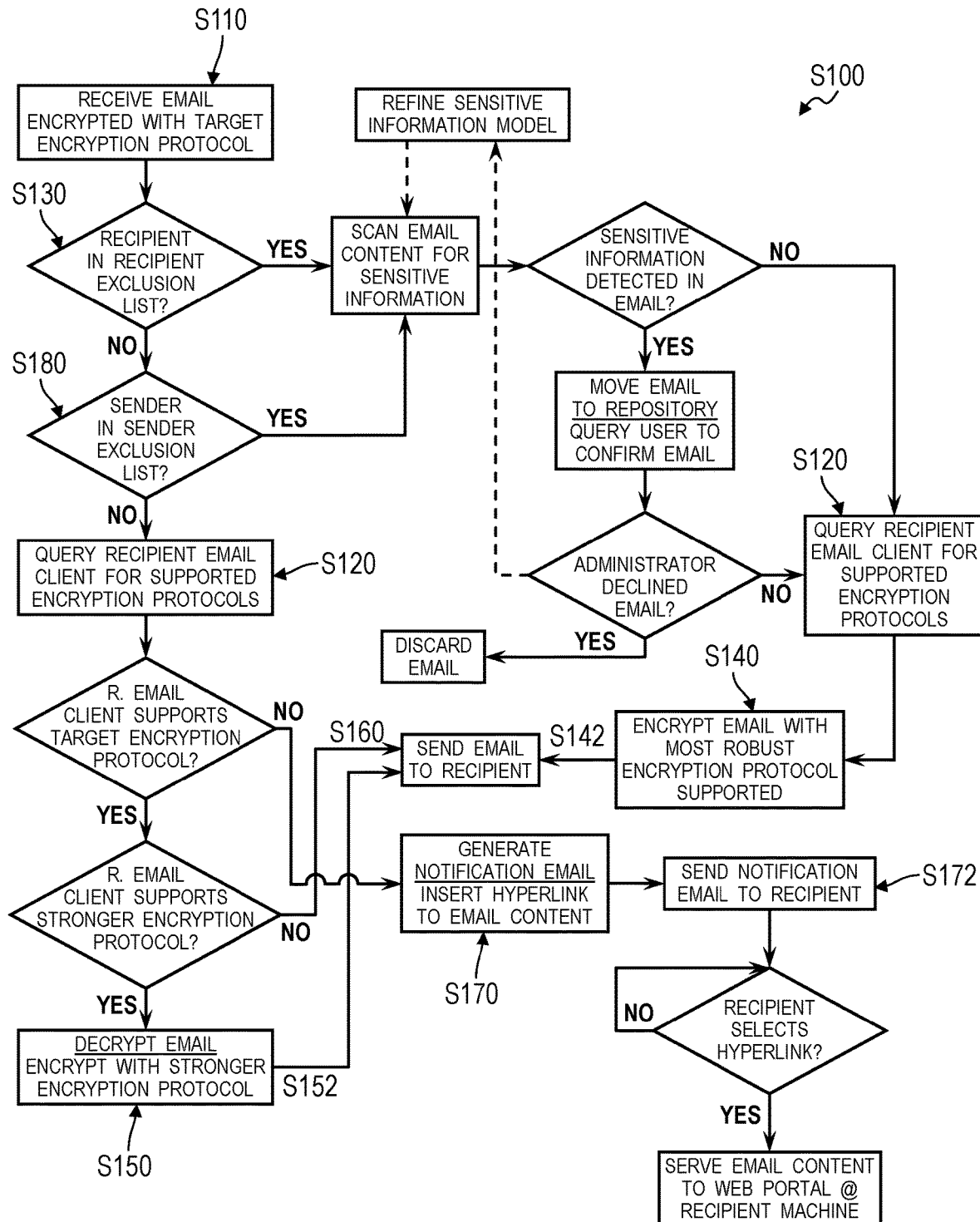
FIG. 2 is a flowchart representation of one variation of the method.

One variation of the method S100 shown in FIG. 2 includes: receiving an email encrypted according to a first encryption protocol in Block S110, the email sent by a sender at a first domain and designating a recipient address within a second domain; and, in response to a sender exclusion database identifying the sender, passing the email encrypted according to the first encryption protocol to the recipient address in Block S180. The method S100 also includes, in response to the sender exclusion database excluding the sender: verifying encryption protocols supported by a recipient mail client at the recipient address in Block S120; and, in response to the recipient mail client supporting the first encryption protocol, transmitting the email encrypted according to the first encryption protocol to the recipient address in Block S160. The method S100 further includes, in response to encryption protocols supported by the recipient mail client excluding the first encryption protocol: generating a notification email comprising a hyperlink to a secure webpage containing content of the email in Block S170; and transmitting the notification email to the recipient address in Block S172.

Figure 3:
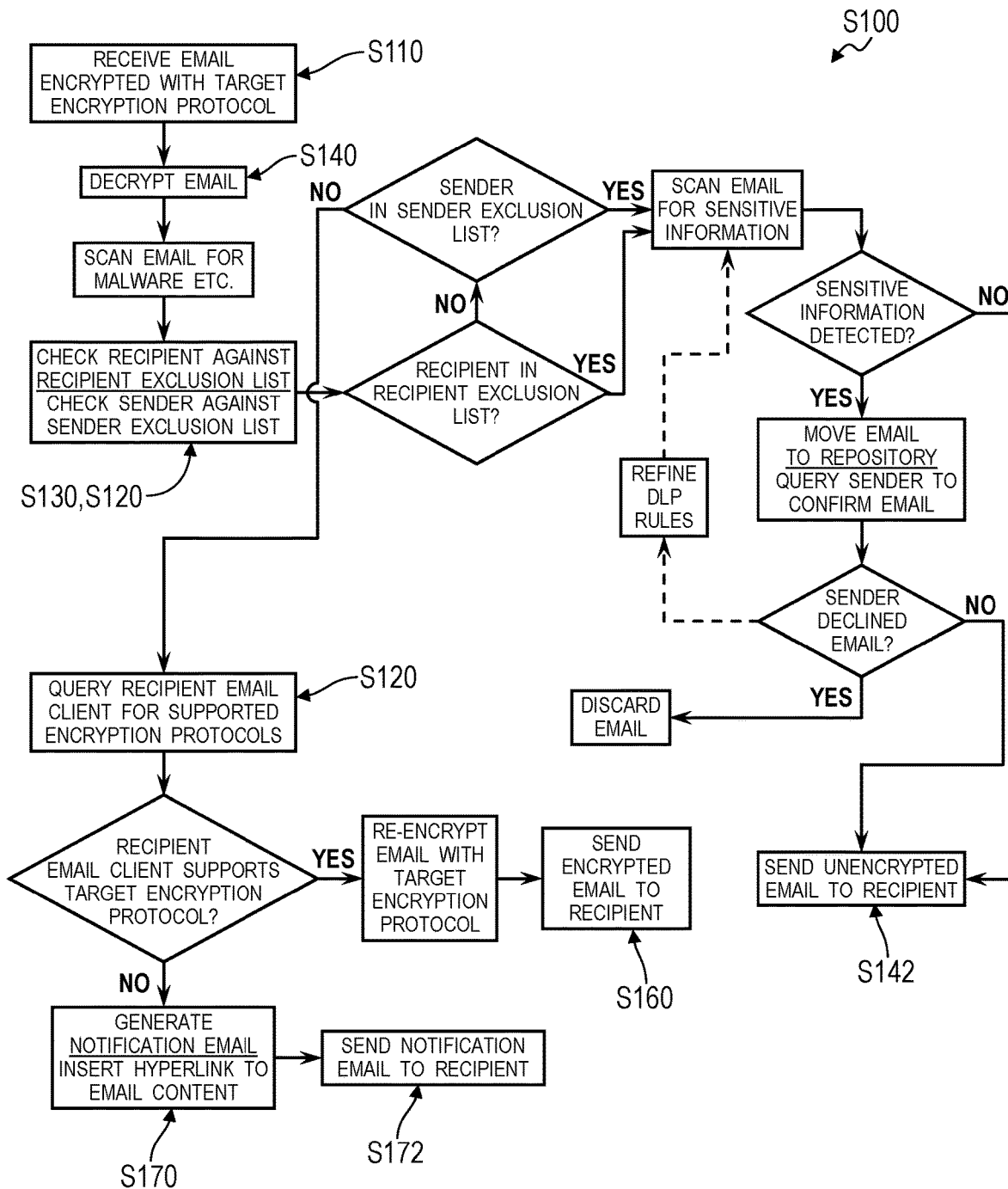
FIG. 3 is a flowchart representation of one variation of the method.

Another variation of the method S100 shown in FIG. 3 includes: receiving an email in Block S110, the email sent by a sender at a first domain and designating a recipient address within a second domain; and, in response to a sender exclusion database identifying the sender, passing the email through to the recipient address in Block S180. The method S100 also includes, in response to the sender exclusion database excluding the sender: verifying encryption protocols supported by a recipient mail client at the recipient address in Block S120; and encrypting the email according to the target encryption protocol and transmitting the email encrypted according to the target encryption protocol to the recipient address in Block S160 in response to the recipient mail client supporting a target encryption protocol. The method S100 further includes, in response to encryption protocols supported by the recipient mail client excluding the first encryption protocol: generating a notification email comprising a hyperlink to a secure webpage containing content of the email in Block S170; and transmitting the notification email to the recipient address in Block S172.

2. Applications

Generally, Blocks of the method S100 can be executed by an outgoing mail server (e.g., a mail user agent ("MUA"), such as a Simple Mail Transfer Protocol ("SMTP") server) or by a security server (e.g., a message transfer agent ("MTA")) that cooperates with an outgoing mail server to transfer an email from a sender to a recipient in order to achieve at least a secure minimum level of end-to-end email encryption between a sender and a recipient despite an encryption protocol supported by the recipient's mail client. The method S100 can also be executed by an outgoing mail server or MTA to deescalate encryption of an email transmitted from a sender to a recipient if an existing recipient exclusion list contains the recipient's email address or specifies the recipient domain, thereby enabling the sender to send emails encrypted end-to-end to recipients by default but to also populate a persistent list of recipients and/or domains to which unencrypted emails—despite possibly containing privileged content—are sent automatically from the sender domain. The method S100 can be also executed by an outgoing mail server or MTA to selectively implement end-to-end encryption for emails sent by a subset of users on a domain and to selectively implement data loss prevention techniques to detect sensitive information (e.g., personal health information) in emails sent by other users on the domain.

In particular, the outgoing mail server, MTA, or other security server can implement Blocks of the method S100 to confirm that a sender of an email and a specified recipient of the email are not listed on sender and recipient exclusion lists, respectively. If neither the sender nor the recipient are listed on sender or recipient exclusion lists, the security server can test the recipient's mail client to confirm that the recipient's system supports email encrypted to at least a preset minimum level of encryption; if so, the security server can encrypt the email to the maximum level of encryption (e.g., according to a most robust encryption protocol) supported by the recipient's system and pass this encrypted email to the recipient's address; otherwise the security server can extract contents of the email, send a web link to the recipient via another email, and serve the contents of the email to a web browser executing on the recipient's machine via a secure connection. However, if at least one of the sender and the recipient is listed in a sender or recipient exclusion list, the security server can: pass the email in original (encrypted or unencrypted) or decrypted form to the recipient; and implement data loss prevention techniques to scan the email for sensitive information and flag the email for further review by an administrator or by the original sender if such sensitive information is detected in the email. The security server can therefore implement the method S100: to ensure that email is encrypted to at least a preset minimum level of encryption from sender to recipient for senders who have such encryption services activated for the email accounts and for recipients with systems capable of receiving encrypted email; to ensure that recipients of encrypted emails are able to view these emails even if their mail clients do not support encrypted email; and to implement additional automated security measures or to prompt additional manual security checks before sending unencrypted emails originating from senders and/or designating recipients with deactivated encryption services.

3. Security Server

The method S100 is described herein as executed by a security server functioning as an MTA and contracted with a domain to handle emails—outbound from a server hosting the domain—according to the method S100. However, Blocks of the method S100 can be similarly executed directly by an MUA (e.g., an outgoing mail server) or any other server or computer system hosting the domain or connected to an internal network affiliated with the domain to selectively distribute encrypted emails from senders within the domain to recipients in other domains. When executing Blocks of the method S100, the security server can interface with web-based mail clients accessed through web browsers and/or application-based mail clients for both senders and recipients of encrypted emails.

As described above, a security server executing Blocks of the method S100 can function as a first message transfer agent ("MTA")—between a sender's outgoing mail server and a recipient's incoming mail server—that: receives an email from an outgoing mail server on its way to a designated recipient; checks the security of the email and its designated destination; selectively passes the email to other MTAs on its way to the recipient's incoming mail server if the recipient's mail client supports a preset minimum level of encryption or an encryption protocol of minimum robustness (e.g., a 128-bit-length symmetric-key cipher); and selectively generates and sends a lower-encryption notification email containing a link to content of the email to the recipient if the recipient's mail client does not support the minimum level of encryption and the recipient (e.g., the recipient's address or domain) is not noted on a recipient exclusion list.

When the security server is integrated into an internal network, with an outgoing mail server, or with a mail client, the sender's mail client can be configured to encrypt outbound emails locally according to an encryption protocol of minimum robustness and to transmit encrypted email to an affiliated outbound mail server for subsequent delivery to a recipient. Upon arrival from the sender's mail client to the security server, an email is already encrypted from its origin. The security server queries the recipient's mail client (or incoming mail server or domain) for encryption protocols it supports in Block S130. If the recipient's mail client supports the original encryption protocol with which the email was first encrypted (e.g., at the sender's mail client or outbound mail server), the security server passes the email along to the recipient in Block S160. However, if the second incoming mail server does not support the original encryption protocol (or other minimum level of encryption assigned to the sender domain to maintain a minimum risk of compromise for contents of email outbound from the sender domain) and if the recipient's address or domain is not listed on a current recipient exclusion list, the security server can: generate a notification email containing a hyperlink to access the encrypted email within a secure web portal, and transmit the notification email—which contains no privileged information—directly to the recipient's mail client in place of the original encrypted email (rather than bounce the encrypted email back to the sender).

Upon receipt of the notification email at the recipient's mail client, the recipient can select the hyperlink to automatically open a web browser and to navigate to a secure web portal that then downloads and decrypts the original encrypted email locally at the recipient's machine and presents content from the encrypted email to the recipient in unencrypted form. The web portal can thus function as a final terminal at which the encrypted email is presented to the designated recipient. The recipient can also respond to the email within the web portal, and the web portal can encrypt the recipient's response before transmitting the recipient's response in the form of a reply email back to the sender such that the original email from the sender and the recipient's response remain encrypted from end-to-end.

4. Compliance

The security server can therefore execute Blocks of the method S100 to ensure that content of an encrypted email transmitted from a sender to a recipient reaches the recipient despite encryption protocols supported by the recipient's mail client and without requiring the recipient to enter additional login information (e.g., a username or password) beyond logging into her mail client, while also ensuring that content of the email remains encrypted from the sender's mail to the recipient's mail client. Because the recipient's mail client may already be password protected and because login credentials selected by the recipient to access an encrypted email are likely to mimic or mirror password credentials for her mail client, an additional password or access code to open an encrypted email may not significantly increase security of email received by the recipient's mail client. For example, if the recipient's email account is already hacked, then a second email containing a password or access code for an encrypted email may also be available to a hacker. Furthermore, emails that require per-email login credentials (e.g., a password or access code) may create additional burden for the user, which may discourage compliance and encourage workarounds.

By executing Blocks of the method S100 to replace encrypted emails with notification emails containing (encrypted) links to web portals containing encrypted content from these original encrypted emails—only when recipient mail clients do not support encryption protocols applied to these emails but otherwise passing encrypted email on to their recipients—the security server can both leverage security credentials already in place at the sender's and recipient's mail clients to restrict local access to and ensure that these emails remain sufficiently encrypted and secure as these emails are routed through various MTUs and MUAs between sender and recipient mail clients. In particular, the security server ensures that emails sent by a sender (or all senders on an internal network or at a contracted domain) remain at a level of encryption sufficient to meet regulatory requirements, such as HIPAA requirements for transmitting patient medical records, and the security server does not permit a recipient's mail client—which may not support the encryption protocol necessary to meet such regulatory requirements—to determine the encryption protocol applied to the sender's email when transmitted to the recipient. Rather, the security server retains end-to-end control over the level to which the sender's email is encrypted by transmitting the encrypted email to the recipient's mail client only if the recipient's mail client supports a preset minimum level of encryption (e.g., a encryption protocol of at least minimum robustness) and otherwise hosts an alternative secure web portal (e.g., a "webapp") through which to serve content from the encrypted email to the recipient.

Contents of the original encrypted email and all replies to the original encrypted email made by the recipient can thus remain within secure mail clients (e.g., persistent application-based mail clients and/or persistent or transient web browser-based mail clients) from end-to-end regardless of the security level of the recipient's mail client and without necessitating an additional password or access code for the recipient to access an encrypted email.

The security server enables an encrypted email to pass through various subsequent MTAs on its way to the recipient's mail client if the recipient's mail client supports the preselected encryption protocol representing at least a preset minimum level of security. If the recipient's mail client does not support such encryption, the security server withholds the email and replaces it with a notification email containing a link to a security web portal through which the recipient can access content of the original email. By transmitting a notification email to the recipient in place of either a secure email that the recipient's mail client does not support or an unsecured (e.g., plain text) email containing privileged content, the security server can require malware, line-sniffing bots, and/or other malicious software executing on MTAs between the security server and the recipient's incoming mail server to perform an additional step to access this privileged content. For example, the nature of the hyperlink and the secure content to which it links may not be immediately evident to automated malicious scripts that scan emails passing through MTAs; these malicious scripts may therefore ignore a hyperlink in a notification email and thus avoid accessing privileged content from the original email. In particular, replacing an encrypted email that cannot be accessed by the recipient's mail client with a plain text notification email incorporating an encrypted hyperlink, the security server ensures that no privileged information is contained directly within the body of the unencrypted notification email such that no privileged information may be scraped from the notification email by automated malicious software that may intercept the notification email between the security server and the recipient's incoming mail server.

The security server executing Blocks of the method S100 can therefore add a degree of separation between a notification email indicating receipt of an encrypted email and the actual content of the encrypted email when a recipient's mail client fails to support a preset minimum level of encryption (e.g., necessary to fulfill regulatory requirements), thereby reducing ease with which unauthorized parties may access privileged content in the encrypted email despite the minimal (or non-existent) encryption protocols that may be supported by the recipient's mail client.

5. Example

In one example, a sender logs in to a web-browser-based or application-based mail client at her computing device in order to access her email account within a domain contracted with the security server (or hosted by a first outgoing mail server internally executing Blocks of the method S100) to manage encryption checks for inbound and outbound emails for the sender and other users within the same domain. The sender then composes an email, such as by inserting text attachments, and designates a recipient of the email. Before transmitting the email to the first outgoing mail server (e.g., a MUA or Simple Mail Transfer Protocol ("SMTP") server), the sender's mail client encrypts content within the email, such as by implementing a symmetric-key algorithm containing a block of minimum size (e.g., 128 bits) and a key of minimum length (e.g., 128, 192, or 256 bits) to achieve a minimum degree of security for transferring sensitive data, such as for transferring patient medical health records or classified (e.g., top secret) documents. Upon receipt of the encrypted email from the sender's computing device, the first outgoing mail server communicates with a Domain Name Server ("DNS") to retrieve the location of the recipient specified in the encrypted email. If the recipient is within the same domain as the sender, the first outgoing mail server can deliver the encrypted email directly and immediately to the recipient. However, if the recipient domain is outside of the sender domain, the first outgoing mail server can transfer transmission data and the encrypted content of the encrypted email to the security server, which can function as a first MTA to which all outgoing, out-of-domain email is first delivered by the outgoing mail server, as described above and shown in FIG. 1A.

5.1 Example: Maximum Level of Encryption Supported

The security server implements a minimum level of encryption (e.g., an encryption protocol of a least minimum robustness) for email outbound from the sender domain (or specifically outbound from the sender's email account) and selectively executes various Blocks of the method S100 to ensure this minimum level of encryption persists up to delivery of the encrypted email and/or its content to the recipient. Upon receipt of an encrypted email from the first outgoing mail server in Block S110, the security server queries the recipient's mail client for a list of encryption protocols (e.g., encryption ciphers) that the mail client supports in Block S120. For example, the security server can query the recipient domain for names of all inbound mail servers at the recipient domain. For each inbound mail server at the recipient domain, the security server can then: transmit a command to the inbound mail server to simulate an SMTP connection; issue a query for supported encryption options; and store a list of supported encryption options returned by the inbound mail server. The security server can then identify encryption protocols supported by the recipient domain in Block S130 based on the union of encryption options returned by the inbound mail servers at the recipient domain. The system can additionally or alternatively: transmit a query to the recipient's mail client for its enabled email port and a security level of the enabled email port; and then identify a set of encryption protocols supported by the recipient mail client based on the enabled email port and the security level of the enabled email port received in response to this query. The system can also calculate a union of encryption protocols (and other security options) supported by inbound mail servers at the recipient domain and the recipient's mail client; identify a most-robust encryption protocol supported therebetween; and then encrypt the email according to this encryption protocol in subsequent Blocks of the method S100.

5.2 Example: Encryption Protocol Supported

Figure 1A:
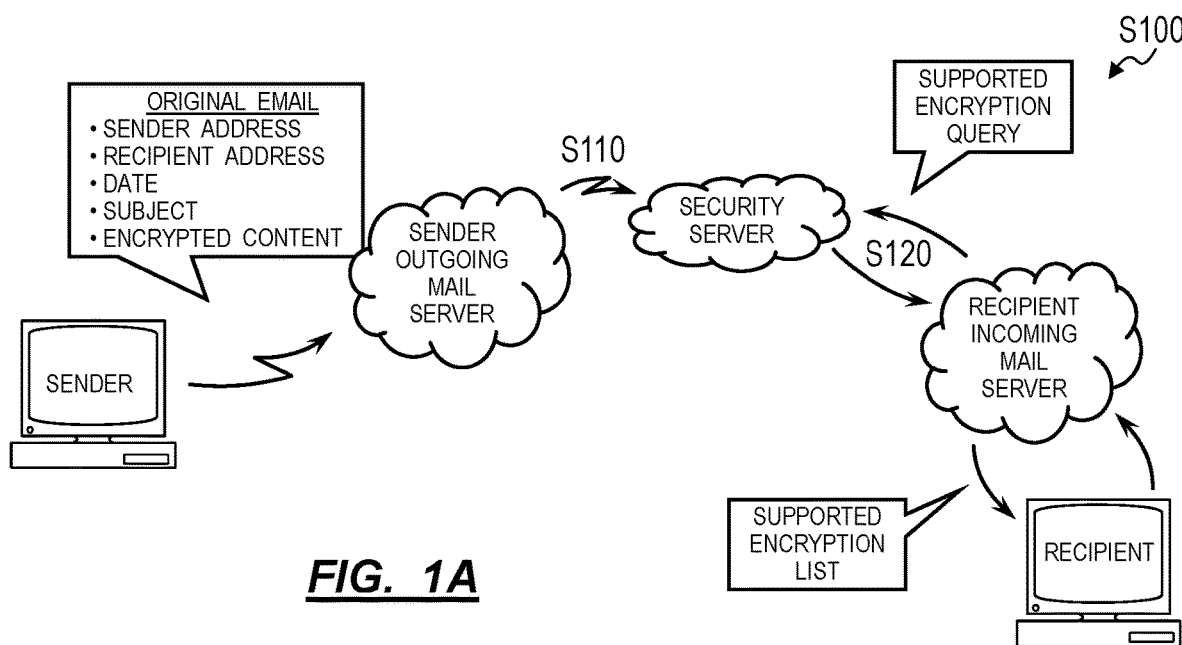
FIGS. 1A-1F are flowchart representations of a method.
Figure 1B:
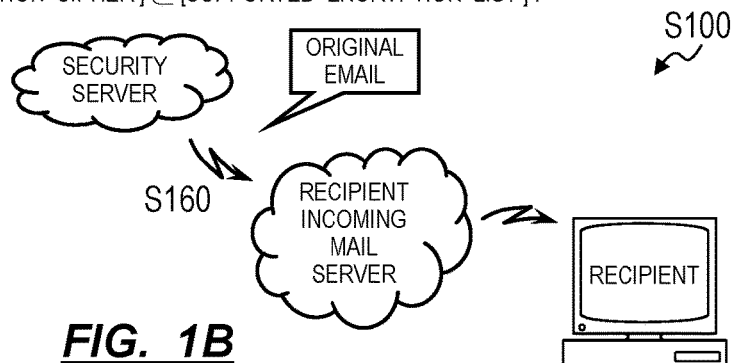

Upon receipt of a list of supported protocols from the recipient's mail client (and/or the recipient's inbound mail server), the security server determines whether the recipient's mail client (and/or inbound mail server) supports the encryption protocol with which the sender's email has been encrypted and/or whether the recipient's mail client supports a more robust encryption protocol than that with which the sender's email was originally encrypted, as shown in FIG. 1A. If the current encryption protocol applied to the sender's email by the sender's mail client is supported by the recipient's mail client and/or inbound mail server, the security server can pass the encrypted email—unchanged—to the recipient's mail client in Block S160, as shown in FIG. 1B. In particular, if the recipient's mail client and/or inbound mail server supports the encryption protocol with which the email has already been encrypted (e.g., at the sender's mail client) or if the most secure encryption protocol supported by the recipient's mail client otherwise includes the encryption protocol with which the sender's email has been encrypted, the security server can release the email to the recipient domain. Alternatively, under similar conditions, the security server can decrypt content of the email encrypted with the original protocol, scan the unencrypted content of the email for viruses and other malware, and then encrypt the email according to the same protocol before passing the email to the recipient's mail client in Block S160. Furthermore, in both Blocks S150 and S160, the security server can append the email with a textual or image-based footer (or header, subject line addendum, etc.) indicating that the email was encrypted from end-to-end (i.e., from the sender's computing device to the recipient's computing device) before re-encrypting the email according to the current encryption protocol and releasing the email to the recipient's incoming mail server.

Figure 1C:
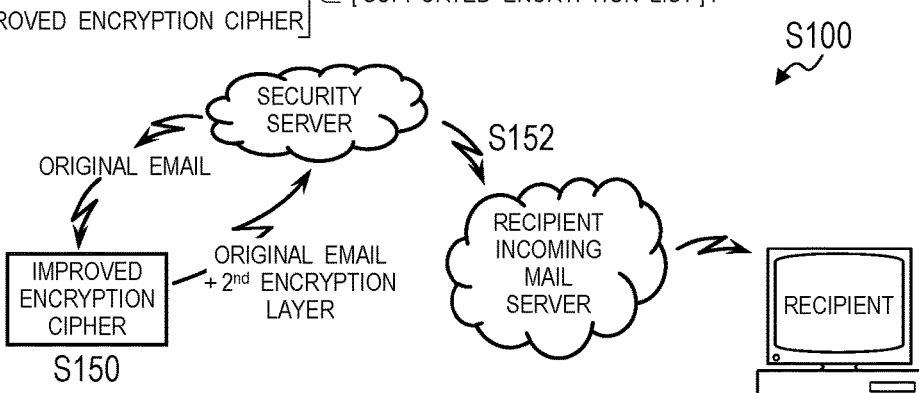

In one variation, if the recipient's mail client is determined to support a more secure encryption protocol, the security server can apply a second layer of encryption to the content of the email according to this more secure encryption protocol supported by the recipient's mail client in Block S150, as shown in FIG. 1C, before passing the encrypted email on to the recipient's incoming mail server in Block S152 (e.g., via one or more other external MTAs). For example, the security server can: decrypt content of the email encrypted with the original protocol; and then re-encrypt this content of the email according to the more secure encryption protocol in Block S150 before passing the email—now encrypted with a more robust encryption protocol—to the recipient's mail client in Block S152.

In the foregoing instances, a second incoming mail server can receive the encrypted email from the sender via the security server (and various other MTAs), and the recipient's mail client can later download the encrypted email from the second incoming mail server (e.g., through Post Office Protocol, or "POP"), decrypt the email, and present content of the email in plain text form to the recipient. The recipient can reply to the sender's encrypted email through her recipient mail client, which can similarly encrypt the reply email and upload this encrypted reply email to a second outgoing mail server hosting the recipient domain. Because the sender domain is outside of the second outgoing mail server, the second outgoing mail server can transmit the reply email to a first incoming mail server hosting the sender domain. The security server can: intercept the reply email; decrypt the reply email; scan the reply email for malware and other security threats; and encrypt the reply email (to the same or more robust encryption protocol) before passing the reply email to the first incoming server at the (original) domain. The security server can thus function as a final MTA that receives and analyzes incoming (e.g., reply) emails before passing such emails along to the first incoming mail server and other recipients within the affiliated domain.

5.3 Example: Encryption Not Supported and Not Excluded

Figure 1D:
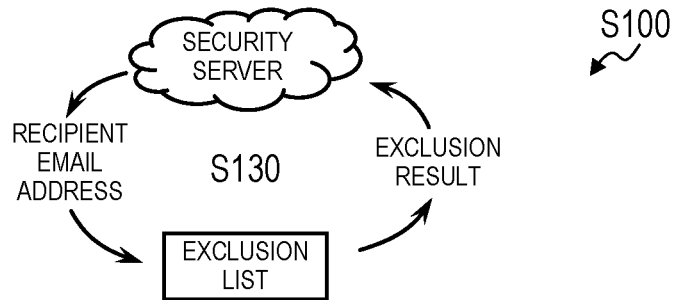

However, if the security server determines that the recipient's mail client does not support the current encryption protocol with which the email has been encrypted (e.g., at the sender's mail client) or that the recipient's mail client does not support an encryption protocol that matches or exceeds in robustness the encryption protocol applied to the sender's encrypted email, the security server can scan a recipient exclusion list for the recipient domain or the recipient's specific email address, as shown in FIG. 1D. For example, the recipient exclusion list can be stored in a local database, populated by an administrator of either the sender domain or the recipient domain, and specifying individual recipient addresses within the recipient domain that are excluded from receiving encrypted emails from the sender domain.

Figure 1E:
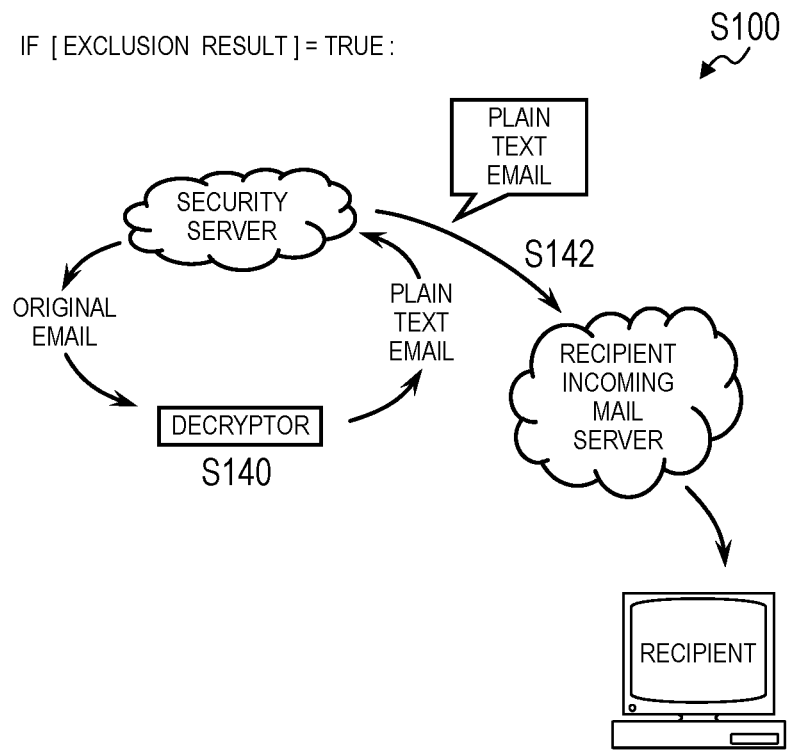
Figure 1F:
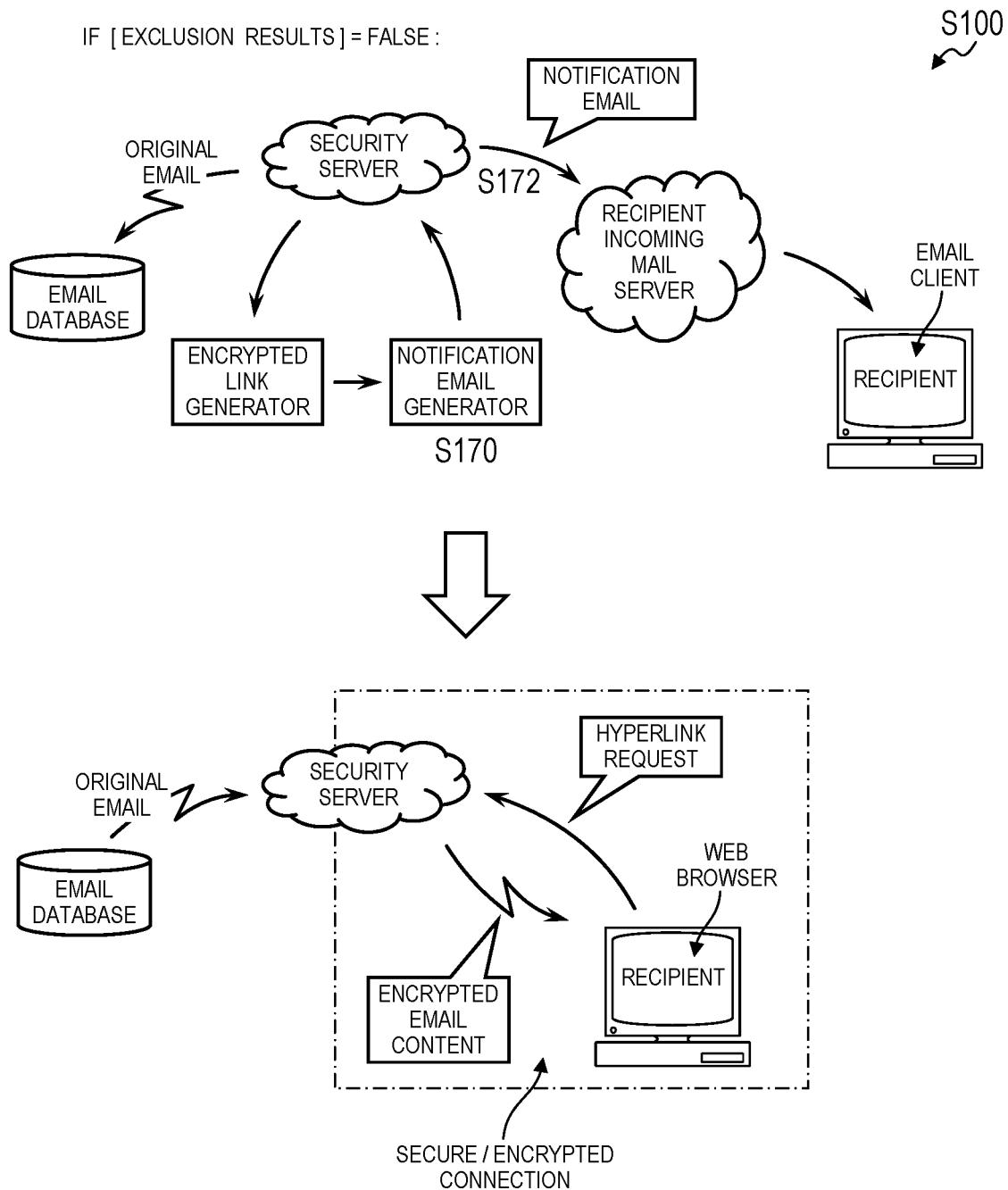

If the recipient domain or email address is not located in the recipient exclusion list, the security server can: store the encrypted email, such as in a local email holding database;

generate a unique persistent hyperlink to the encrypted email; and generate a notification email containing transmission data (e.g., sender address, recipient address, subject line, and send date and time, etc.) from the original encrypted email and the unique persistent hyperlink in Block S170, as shown in FIG. 1F. In Block S170, the security server can also insert into the body of the notification email: instructions to select the hyperlink or to copy the hyperlink into a web browser in order to access encrypted content from the sender's email; another indicator that the recipient has received an encrypted email too sophisticated for the recipient's mail client; and/or a link to an alternate mail client that may better serve the recipient's email needs. The security server can transmit the notification email in plain text to the recipient's incoming server in Block S172. Alternatively, the security server can encrypt the notification email with a less-robust encryption protocol supported by the recipient's web client (as determined in Block S120) before transmitting the notification email to the recipient's incoming server in Block S172.

Figure 4:
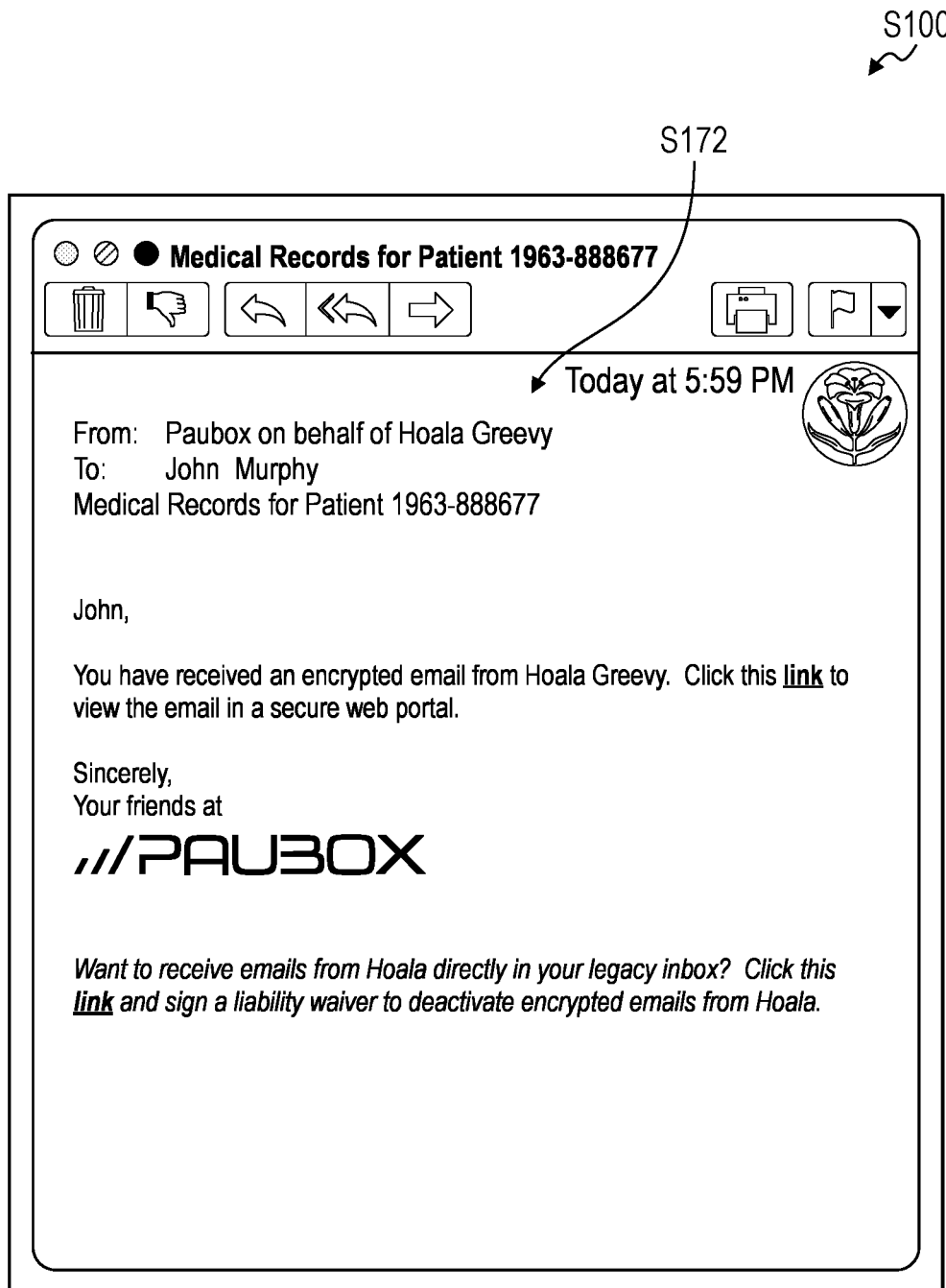
FIG. 4 is a graphical representation of one variation of the method.

As described above, the recipient's mail client can later download the notification email from the incoming mail server, as shown in FIG. 4. Upon viewing the notification email, the recipient can select the hyperlink to automatically open a web browser and navigate to a secure web-browser-based application (or "webapp" or web portal) hosted by the security server. Upon receipt of a query for content at the hyperlink, the security server can return the encrypted email (or encrypted content from the encrypted email) to the webapp via secure protocols, such as via a Transport Layer Security (TLS) or a Secure Sockets Layer (SSL). Upon receipt of the encrypted email, the webapp can decrypt content of the sender's email locally at the recipient's computing device and present this content—such as in the form of plain text, images, audio files, and/or digital files, etc.—to the recipient.

Content in the original email can thus remain encrypted— and therefore relatively secure—from its origin at the sender's computing device to the recipient's computing device regardless of the level of encryption supported by the recipient's mail client or incoming mail server and without requiring the recipient to enter an additional username, password, passcode, and/or other credentials beyond logging in to her mail client in order to access such encrypted content.

5.3 Example: Recipient Encryption Excluded

However, if the recipient domain or email address is located in the recipient exclusion list, the security server can decrypt the sender's encrypted email in Block S140 and transmit the sender's email in unencrypted form to the recipient in Block S142, as shown in FIG. 1E. The security server can also insert a header or footer (or other media)— indicating that the original encrypted email was decrypted before being delivered to the recipient because the recipient is listed on a recipient exclusion list approved by an administrator affiliated with the sender or recipient—into the decrypted email before transmitting the decrypted email to the recipient's incoming mail server. Therefore, the security server can: query the recipient exclusion database for the recipient address in Block S130; and decrypt the email to plain text in response to confirmation of the recipient exclusion database containing the recipient address in Block S140.

The security server can also decrypt the sender's original encrypted email and re-encrypt the sender's email with a less-robust encryption protocol supported by the recipient's web client (as determined in Block S120) before transmitting the lower-encryption email to the recipient's incoming server in Block S142. Therefore, even if the recipient of the email is listed in the recipient exclusion list, the security server can: test the recipient's incoming mail server or email client for the maximum level of encryption supported thereby in Block S120; decrypt the email; and re-encrypt the email according to the most robust encryption protocol supported by the recipient mail client in Block S140, even if this encryption cypher does not meet a preset minimum level of encryption set for the sender domain; and then pass the email on to the recipient in Block S142, thereby achieving at least some end-to-end security for the email.

The security server can thus enable an administrator at a sender domain or at a recipient domain to specify a particular user account, a group of user accounts, or all accounts on the recipient domain to exclude from the minimum encryption requirement, and the security server can deescalate encryption of email sent from the sender (or from the sender domain) to the recipient (or to the recipient domain) according to exclusions enumerated in the recipient exclusion list.

(Alternatively, in this foregoing example, upon receipt of the email, the security server can first scan the recipient exclusion list for the recipient's email address in Block S130 and then selectively execute: Blocks S150, S152, and/or S160 to send the email in encrypted form to the recipient's email client if the recipient's mail client supports an encryption protocol meeting a preset minimum level of encryption assigned to the sender domain and if the recipient is not noted on the recipient exclusion list; Blocks S170 and S172 to send content of the email to the recipient through an encrypted web portal if the recipient's mail client does not support encryption protocols representing as least the preset minimum level of encryption and the recipient is not noted on the recipient exclusion list; and Blocks S140 and S142 to decrypt the email and then release the decrypted email to the recipient's address if the recipient is noted on the recipient exclusion list.)

5.4 Example: Sender Excluded

In addition to checking whether the recipient of the email is noted on the recipient exclusion list, the security server can also check whether the sender is noted on a sender exclusion list. For example, the sender exclusion list: can be stored in a local database; can be populated by an administrator of the domain to distinguish users on the domain for whom end-to-end email encryption is not enabled from other users for whom end-to-end email encryption is enabled; and can specify individual sender addresses within the first domain that are excluded from sending encrypted emails. Upon receipt of the email from the sender and before testing the recipient's mail client and/or incoming mail server for supported encrypted protocols in Block S130, the security server can scan the sender exclusion list for the sender's email address (or other identifier) and then: pass the email— unchanged—to the recipient's incoming server without encryption checks if the sender is noted in the sender exclusion list. If the sender is noted in the sender exclusion list, the security server can also decrypt the email to plain text and scan the email for malware and other security threats before sending the email to the recipient's incoming server.

Alternatively, the security server can encrypt the email according to a most-robust encryption protocol supported by the recipient's mail client—regardless of a minimum level of encryption assigned to the sender domain—even if the sender is identified in the sender exclusion list.

5.5 Example: Data Loss Prevention for Excluded Sender and/or Recipient

Furthermore, if either the sender or the recipient of the email is noted on an exclusion list, the security server can implement data loss prevention techniques to scan the email for sensitive information (e.g., personal health information) and flag and withhold the email if such data is detected, rather than enforce the minimum level of encryption assigned to the sender domain. Thus, the security server can enforce a minimum degree of security for emails outbound from select users on the sender domain in order to limit risk that information in these emails may be compromised in transit to or at recipient mail clients. However, because enforcement of such encryption may not be generally necessary for all users on the sender domain and/or because encrypted emails may yield some additional burden to recipients of emails originating at the sender domain, the security server: can permit an administrator to deactivate encryption minimums for select users on the sender domain; scan emails from these select senders for sensitive information; and flag emails determined to contain such sensitive information, thereby reducing opportunity for unencrypted emails—which may be more easily intercepted or accessed maliciously—contain sensitive, protected information.

6. Link+Remote Content Access

Block S170 of the method S100 recites—in response to the recipient exclusion database excluding the recipient address and encryption protocols supported by the recipient mail client excluding the first encryption protocol—generating a notification email comprising a hyperlink to a secure webpage containing content of the email. Generally, in Block S170, the security server: stores a copy of the encrypted email, such as locally or in a remote database; generates a hyperlink to a webapp that, when selected from the notification email by the recipient, downloads and decrypts this copy of the encrypted email locally at the recipient's computing device; and populates a new notification email with the hyperlink. By withholding the sender's original encrypted email from the recipient and instead sending the notification email—such as in plain text or lower encryption/less secure form—in Block S172, the security server can notify the recipient of availability of secure encrypted content and provide the recipient simple (e.g., one-click) access to this secure encrypted content without decrypting or reducing a level of encryption of this content at any point between the sender's machine and the recipient's machine (exclusive) despite limited encryption protocols supported by the recipient's mail client. In particular, in Blocks S170 and S172, the security server can selectively move consumption of content from the recipient's mail client to a secure portal within a web browser executing on the recipient's machine, thereby ensuring end-to-end encryption of the content of the email even to a legacy email system that is not capable of receiving encrypted email. However, by also implementing Blocks S150, S152, and/or S160, the security server: can preserve access to email content directly within an email viewed within the recipient's mail client if the recipient's mail client does support at least the minimum level of encryption, thereby minimizing interference and limiting additional burden for exchanging secure emails between the sender domain and many external domains.

In one implementation, the security server generates an encrypted link in Block S170, as shown in FIG. 2. For example, the security server can generate a hyperlink, encrypt the hyperlink with a 256-bit-length symmetric-key protocol, and insert the encrypted hyperlink into the notification email in Block S170. When the hyperlink is selected from the notification email by the recipient, the recipient's web browser can open the hyperlink, which remains encrypted via a Hypertext Transfer Protocol Secure ("HTTPS," HTTP over TLS, HTTP over SSL, or HTTP Secure) connection with the related content from the original encrypted email remaining in an encrypted state in a remote database or on the security server.

The security server can also execute various security measures to thwart unauthorized access to the hyperlink by other than the recipient. In one example, the security server disables the hyperlink after one use, thereby enabling the recipient to access encrypted content from the sender's original email via the webapp only once. In this example, once the recipient's web browser navigates to the webapp containing content from the sender's encrypted email, the webapp can also download the original encrypted email to the recipient's computing device automatically or in response to selection of a download link within the webapp. Furthermore, in this example, the webapp can download an encrypted email reader application—with the encrypted email—to the recipient's computing device if an application capable of reading the encrypted email is not currently installed on the recipient's computing device, thereby enabling the recipient to access and view the encrypted email locally on her computing device at a later date despite subsequent immobilization of the hyperlink. In a similar example, the security server can disable the hyperlink after a limited number (e.g., three) of selections of the hyperlink. The security server can also disable the hyperlink after a limited period of time, such as one week.

In another example, the security server permits access to encrypted content in the original email via the webapp only if the computing device requesting access to the hyperlink is located on a network to which the original email was originally addressed. For example, when generating the hyperlink in Block S170, the security server can: request the IP address of the recipient's computing device or the network IP address of the internal network on which the recipient's computing device is located; and then link this IP address with encrypted content of the sender's email. In this example, upon receipt of a request to access encrypted content at the hyperlink, the security server can confirm that the IP address of the computing device requesting access matches the IP address stored with the encrypted content of the sender's email before returning the webapp and encrypted email to the computing device. The security server can thus gate access to encrypted content from the sender's email based on the IP address of the recipient's computing device or network, thereby preventing another, unauthorized computing device (e.g., a computing device executing malicious software) from accessing encrypted content from the sender's email despite having access to the hyperlink from the notification email.

However, the security server can implement any other methods or techniques to limit access to encrypted content at the hyperlink to only an authorized recipient without necessitating that the recipient use a password or other login credentials.

7. Recipient Exclusions

Block S130 recites querying a recipient exclusion database for the recipient address. Generally, in Block S130, the security server confirms that the recipient of the sender's email specifically or the recipient domain generally is not on a recipient exclusion list before implementing other Blocks of the method S100 to: confirm security of the email in Block S160; increase the security of the email in Block S150; or transition consumption of content in the email to an encrypted portal in a web browser in Block S170. However, if the recipient's address or domain is listed on the recipient exclusion list, the security server can deescalate encryption of the sender's email and serve the email to the recipient in a less-secure (e.g., unencrypted form) form, as shown in FIGS. 2 and 3. In particular, the security server can enable an administrator of the sender domain or of the recipient domain to add the recipient to a recipient exclusion list; once the recipient is added to the recipient exclusion list, the security server can withhold encrypted level checks on emails designating this recipient—and even decrypt these emails if specified in the recipient exclusion list—when passing these emails to the recipient's incoming mail server, thereby enabling the recipient to access and view content of these emails in unencrypted, unsecured form.

7.1 No Encryption

The security server can store the recipient exclusion list locally or in a remote database and can access the recipient exclusion list upon receipt of an encrypted email in Block S110 or upon determination that the recipient's mail client does not support the current encrypted protocol of the email in Block S120. In one implementation, the recipient exclusion list specifies that no email sent: from the sender domain (or from particular accounts within the sender domain or from the sender specifically); to a particular recipient (e.g., to the recipient's email address; to the recipient's entire domain; or to particular accounts within the recipient domain) is to be encrypted. In this implementation, the security system can: automatically decrypt all emails that match sender and/or recipient exclusion criteria contained in the recipient exclusion list in Block S140; scan these emails for malware and other security threats; and then pass these decrypted email to the recipient's incoming mail server in Block S142, as shown in FIG. 3.

7.2 Reduced Encryption

Alternatively, upon receipt of an email in Block S110, the security server can: automatically decrypt all emails that match sender and/or recipient exclusion criteria contained in the recipient exclusion list in Block S140; query the recipient's mail client and/or inbound mail server for supported encryption protocols in Block S120; decrypt the email to plain text; re-encrypt the email to a maximum security level supported by the recipient's mail client and incoming mail server—which may be null, a less-secure encryption protocol, or even a more secure encryption protocol—regardless of the minimum level of encryption assigned to email outgoing from the sender domain in Block S142; and then pass the email to the recipient's incoming mail server in Block S142, as shown in FIG. 2. Therefore, in this implementation, the security server can disable execution of Blocks S170 and S172 to separate notification of an email from consumption of its content if the designated recipient of the email is noted in the recipient exclusion list.

The recipient exclusion list can additionally or alternatively specify that a less secure encryption protocol is approved for email communications between a particular sender and a particular recipient, between two particular domains, or between select email addresses within these two domains. In this implementation, the security server can: decrypt all emails that match exclusion criteria in the recipient exclusion list and re-encrypt these emails with a less secure encryption protocol supported by the recipient's mail client; or decrypt all emails that both match exclusion criteria in the recipient exclusion list and for which a recipient's mail client does not support a more robust encryption protocol with which a sender's email has already been encrypted by the sender's mail client and re-encrypt these emails with a less secure encryption protocol supported by the recipient's mail client.

The recipient exclusion list can therefore specify that emails: inbound to a particular recipient; inbound to a particular domain; or inbound to select accounts within a particular domain are to be either fully decrypted before transmittal to their respective recipients or decrypted and re-encrypted with a less secure encryption protocol. An entry in the recipient exclusion list can thus define a global setting enabling the security server to deescalate encryption levels of emails inbound from any number of domains to a particular domain or to a particular recipient within a particular domain. The recipient exclusion list can also specify that emails: outbound from a particular sender, from a particular domain, or from select senders within the particular domain; and inbound to a particular recipient, to a particular domain, or to select accounts within the particular domain are to be similarly decrypted and/or re-encrypted with a less-secure encryption protocol before delivery. An entry in the recipient exclusion list can thus specify that the security server deescalate encryption levels of emails inbound from a specific sender or specific sender domain—rather than from all domains—to a particular recipient or particular domain of the recipient.

7.3 Time Limits

Furthermore, the recipient exclusion list can define time limits for exclusion criteria, such as particular times of day, days of a week, months of a year, or discrete time periods (e.g., 20 Jan. 2016 through 10 Mar. 2016) over which deescalated encryption protocols are authorized for select recipients. The recipient exclusion list can also define keyword criteria that trigger de-authorization of an email for less-secure transmittal. For example, the recipient exclusion list can specify that any email containing "secret," "top secret," or "health records," etc. in its subject line does not meet exclusion criteria in the recipient exclusion list and must therefore be transmitted in its current or higher encryption state. However, the recipient exclusion list can specify any other number and type of exclusion criteria for triggering deescalated encryption protocols for transmission of emails.

The security server can thus extract transmission data—such as sender address, sender domain, recipient address, recipient domain, transmission rate, and/or subject line, etc.—from the sender's email and compare these data to the recipient exclusion list to determine whether an encrypted email may be decrypted and sent in plain text form or decrypted and re-encrypted with a less secure encryption protocol. The secure server can handle transmittal of emails to a recipient accordingly in Blocks S140, S142, S150, S152, S160, S170, and S172 described above.

7.4 Administrator Management of Exclusion Lists

In one implementation, an administrator of the sender domain populates the recipient exclusion list with recipient addresses, recipient domains, and/or other exclusion criteria. In this implementation, the administrator can enter a specific recipient email address or an entire email domain to exclude from the preset minimum encryption requirement described above, such as in response to a previous request from the recipient or the administrator of the recipient domain to receive less-secure versions of encrypted emails rather than notification emails, as described above. By entering a recipient address or recipient domain into the recipient exclusion list, the administrator can thus trigger the security server to bypass various encryption rules when an email designating the recipient address is received by the security server, such as: to bypass a preset minimum level of encryption or encryption protocol of minimum robustness for application to emails outbound from the sender domain; and/or to bypass transmission of a notification email in place of an encrypted email for instances in which the recipient's mail client does not support the preset minimum level of encryption.

An administrator of the recipient domain can additionally or alternatively populate the recipient exclusion list with sender addresses, sender domains, and/or other exclusion criteria. As described above, the administrator of the recipient domain can access a web portal to enter email addresses and/or domains of senders and recipients for which the administrator has authorized plain text or less-secure emails to enter and leave her domain. In this implementation, the security server can require the administrator of the recipient domain to sign and submit a written document requesting exclusion from minimum secure email exchange, acknowledging that such exclusion may compromise email security within the recipient domain, and acknowledging responsibility on the part of the recipient domain if emails sent to or from the domain are compromised. Once such acknowledgement is received from the administrator of the recipient domain, the security server can enable the administrator of the recipient domain to populate the recipient exclusion list.

Alternatively, the security server can: collect an encrypted email waiver and email addresses that the administrator of the recipient domain wishes to add to the recipient exclusion list; and serve the encrypted email waiver and these addresses to the administrator of the sender domain for processing. For example, the recipient of encrypted email from the sender domain may express—to the administrator of the recipient domain—dissatisfaction with being able to view content of an email received from the sender domain only through a web browser, per encryption protocol of minimum robustness implemented by the security server in Blocks S170 and S172. Accordingly, the administrator of the recipient domain can navigate to a web portal associated with the security server (e.g., accessed via a link inserted by the security server into an email sent from the sender domain to the recipient domain, as described below) or interface with the administrator of the sender domain to: submit a request on behalf of the recipient to omit the recipient's email address from encrypted email from the sender domain; access and execute an encrypted email waiver specifying assumption of liability for data loss in emails exchanged between the sender domain and the recipient's email address; and submit the encrypted email waiver to the administrator of the sender domain. The administrator of the sender domain can process this request manually to add the recipient's email address to the recipient exclusion list. Alternatively, the security server (or related computer system) can: collect the request and the encrypted email waiver submitted by the administrator of the sender domain; confirm completion of these electronic documents; store the encrypted email waiver in a waiver database; and then add the recipient's email address to the recipient exclusion list automatically.

However, the administrator of the sender domain, the administrator of the recipient domain, and/or the security server itself can implement any other process to populate the recipient exclusion list with email addresses or other identifying information of recipients to be excluded from receiving encrypted emails from senders in the sender domain.

7.5 Recipient Opt-Out

In another implementation, the security server (or related computer system) can enable the recipient of the email to opt out of end-to-end encrypted emails directly. In one example shown in FIG. 4, the security server inserts—into the original email handled in Block S142, S152, or S160 or into the notification email generated in Block S170—a header or footer containing an opt-out hyperlink and a description indicating that the recipient (or an administrator of the recipient domain) can select an option to receive unencrypted or lower-encryption emails from the sender in the future by signing an agreement found at the opt-out hyperlink.

In a similar implementation, the security server can insert into the notification email—generated in Block S170—a hyperlink to a webpage in which to view content from the original email. In response to selection of the hyperlink at the recipient mail client executing on the recipient's computing device: the recipient's computing device can open a web browser; the web browser can navigate to a URL specified in the hyperlink; and the security server can serve a secure webpage containing content of the original email as well as an opt-out hyperlink to the web browser.

In the foregoing implementations, in response to selection of the opt-out hyperlink, the security server (or related computer system) can serve, the web browser executing on the recipient's web browser, an opt-out webpage containing: an electronic contract (i.e., an encrypted email waiver) for assuming liability by the recipient for data loss for inbound emails from the first domain to the recipient address in exchange for disabling encryption of inbound emails from the sender domain to the recipient's email address; an electronic signature line for executing the electronic contract; and an option to submit the electronic contract. In response to execution of the electronic contract by the recipient through the opt-out webpage, the security server (or related computer system) can automatically append the recipient address to the recipient exclusion database and load the electronic contract into a waiver database.

Alternatively, the security server can return the electronic contract directly to the administrator of the sender domain for manual processing. Yet alternatively, the security server can: also prompt the recipient to select from a prepopulated list of reasons or to manually enter a reason for disabling end-to-end email encryption for emails received from the sender domain; return the electronic contract to the administrator of the recipient domain for confirmation; and then automatically update the recipient exclusion list accordingly or serve this confirmed encrypted email waiver to the administrator of the sender domain for final processing.

In the foregoing implementation, the security server can also provide the recipient—through the opt-out webpage—options to either: disable end-to-end encrypted emails between the recipient and the sender domain entirely; or authorize reduced end-to-end encryption requirements for emails exchanged between the recipient and the sender domain (and thereby disable execution of Blocks S170 and S172 for emails sent from the sender domain to the recipient's email address). Later, the security server can selectively encrypt and/or decrypt emails from the sender domain to the recipient's email address according to the selection thus submitted by the recipient. For example, when decrypting an encrypted email or re-encrypting a sender's email with a less secure encryption protocol in Block S140, the security server can append this less-secure email with a note indicating that the email was sent in a less secure format according to criteria in the recipient exclusion list, such as by incorporating this note in a footer at the bottom of the less-secure email. The security server can also attach a copy of an agreement by the recipient's administrator to receive less-secure or unsecured inbound emails from the sender domain.

8. Sender Exclusion List

As shown in FIGS. 2 and 3, one variation of the method S100 includes Block S180, which recites, in response to a sender exclusion database identifying the sender, passing the email encrypted according to the first encryption protocol to the recipient address. Generally, the security server can implement methods and techniques similar to those described above to: determine whether the sender of the email is listed on a sender exclusion list; selectively implement encryption checks for the email in Blocks S150, S152, S160, S170, and/or S172 if the sender is not listed on the sender exclusion list; and to pass the email—in original or in unencrypted form—to the recipient without such encryption checks—in Block S180 if the sender is listed on the sender exclusion list.

In particular, the security server (or affiliated computer system) can enable the administrator of the sender domain to aggregate users into one of two groups, including: a first group for which all outbound emails are subject to encryption checks to achieve at least a minimum security for these outbound emails (except for emails designating recipients on the recipient exclusion list); and a second group for which such encryption checks are deactivated, thereby enabling users in this second group to send emails at any level of encryption. In one example in which the sender domain is affiliated with a hospital or medical clinic, the administrator can: associate doctors, nurses, and other medical staff in the facility with the first group; associate janitorial, kitchen, security, and other non-medical staff in the facility with the second group; and populate the sender exclusion list with email addresses of users in the second group. Thus, in this example, the security server can implement encryption checks for all emails sent by medical staff to ensure that these emails—which represent a relatively high likelihood of containing personal health and other sensitive information—are encrypted to at least a minimum degree of security. However, the security server can withhold such encryption checks for emails sent by non-medical staff, since these emails may represent a much lower likelihood of containing personal health and other sensitive information.

Similar to Blocks S140 and S142 described above, if the sender of an email is listed in the sender exclusion list, the security server can pass the email in its original format to the recipient's address in Block S180. Alternatively, in Block S180, the security server can decrypt the email—if already encrypted—to plain text before transmitting the email to the recipient's address. Yet alternatively, in Block S180, the security server can: implement methods and techniques described above to identify encryption protocols supported by the recipient's mail client (and/or inbound mail server); and encrypt the email according to a most-robust encryption protocol supported by the recipient's mail client (and/or inbound mail server), regardless of the target encryption protocol and the minimum level encryption assigned to the sender domain, before releasing the email for delivery to the recipient's address.

However, the security server can implement any other methods and techniques to selectively implement encryption checks for emails sent by senders on the sender domain in Block S180.

9. Data Loss Prevention

In one variation shown in FIGS. 2 and 3, the security server implements outbound data loss prevention techniques to: selectively scan emails—originating from senders on the sender exclusion list and/or designating recipients on the recipient exclusion list—for sensitive information (e.g., personal health information); and to selectively withhold these email for further review by the sender or an administrator of the sender domain before releasing these emails for delivery to their recipients if such sensitive information is detected.

9.1 Rules

Generally, in this variation, the security server can implement preset rules correlating textual and/or file content of an email to its likelihood of containing sensitive information. For example, the security server can implement a set of preset rules correlating sensitive information to: a particular file type (e.g., PDFs) of an email attachment; certain alphanumeric sequences, such as nine-digit numerical sequences suggestive of Social Security numbers or eight- or nine-digit alphanumeric sequences suggestive of a driver's license number; and/or other email features.

Upon receipt of an email from a sender listed in the sender exclusion list, the security server can: scan the email for various features; and then determine whether the email (may) contain sensitive information if these features violate a minimum number or weight of these rules; and then flag this email for further review accordingly before releasing the email. However, if no sensitive information is detected in the email, the security server can pass the email—unchanged, fully unencrypted, or encrypted according to a most-robust encryption protocol supported by the recipient's mail client and/or incoming mail server—to the recipient's email address.

Alternatively, upon receipt of an email from a sender listed in the sender exclusion list, the security server can: access a sensitive information model (e.g., neural network) that represents such rules; extract features (e.g., attachment file types, presence of alphanumeric sequences, etc.) from the email; generate a vector representing presence and/or magnitude of these features in the email; and pass this vector into the sensitive information model, which can output a confidence score for presence of sensitive information in the email. If the confidence score for presence of sensitive information in the email remains below a threshold score, the security server can release the email for delivery to the recipient's address. However, if the confidence score for presence of sensitive information in the email exceeds the threshold score, the security server can withhold the email and flag the email for further manual review.

However, in this variation, the security server can implement any other rules—such as discrete rules customized by an administrator of the network or represented in a sensitive information model trained on emails collected over time and labeled as sensitive or not sensitive—to predict presence of sensitive information in an email.

9.2 Admin Controls

In one implementation shown in FIG. 2, if the security server does detect possible sensitive information in the email—such as presence of a possible Social Security number and presence of a PDF attachment in the email—the security server can: withhold transmission of the email to the recipient address; flag the email for manual review by an administrator of the first domain; and store the email in a remote repository for subsequent manual review by the administrator. The security server can also actively serve a prompt to the administrator to review the email. For example, the security server can send a notification email containing the email in question in attachment form to the administrator's email address. Alternatively, the security server can send a notification email containing a hyperlink to a web portal in which to view the email.

The administrator can then review the email and either submit confirmation to the security server (or affiliated computer system) that the email is safe to send to the recipient or submit confirmation to the security server to withdraw the email due to presence of sensitive information. Upon receipt of confirmation to transmit the email from the administrator, the security server can transmit the email—in unencrypted or encrypted form according to a strongest encryption protocol supported by the recipient's mail client and/or incoming mail server—to the recipient address. Otherwise, the security server can discard the email prior to transmitting the email to the recipient's address upon receipt of a command from the administrator to withdraw the email (which the security server can interpret as confirmation of presence of sensitive information in the email).

Therefore, the security server can serve controls for sending or discarding emails containing sensitive information to an administrator of the sender domain if one of the sender and the recipient of the email are included in the sender or recipient exclusion list, respectively, thereby enabling additional manual checks by another entity for emails possibly containing sensitive information but excluded from automated encryption checks.

9.3 Sender Controls

In another implementation in which the sender is not included in the sender exclusion list but the recipient is included in the recipient exclusion list, the security server can decrypt the email (if already encrypted) and scan the email for sensitive information, such as described above. If the security server detects possible sensitive information in the email, the security server can: withhold transmission of the email to the recipient address; and return a notification to the sender indicating possible presence of sensitive information in the email, indicating exclusion of the recipient's email address from encryption checks, and including a prompt to confirm transmission of the email and the possible sensitive information to the recipient's email address. In particular, the security server can notify the sender that the recipient's mail client, incoming mail server, or domain is not configured to receive encrypted email from the sender and prompt the sender to confirm that she still wishes to send the email and its contents to the recipient, as shown in FIG. 3.

In one example, if the security server detects possible sensitive information in the email, the security server can: move the email to a holding repository; and generate a confirmation email containing a note that the email may include sensitive information designating a recipient with encryption deactivated, a first hyperlink to confirm release of the email that contains no sensitive information, a second hyperlink to confirm release of the email despite inclusion of sensitive information in the email, and a third hyperlink to discard the email due to presence of sensitive information; and send this email to the sender's email address. In this example, the security server can also insert or copy into the confirmation email features extracted from the email that the security server correlated with possible sensitive information, such as alphanumeric strings interpreted as Social Security numbers or filenames and types of attachment files interpreted as possibly representing personal health documents. Upon receipt of the confirmation email, the sender can select one of the first, second, and third hyperlinks, which can then open a web portal to confirm that the email will either be sent or discarded based on the sender's selection. The security server can access the sender's selection and then: transmit the email encrypted according to the second encryption protocol to the recipient address in response to selection of either of the first or second hyperlinks; or discard the email prior to transmitting the email to the recipient address in response to selection of the third hyperlink. The security server can also: label the email as containing no sensitive information if the first hyperlink is selected or label the email as representing sensitive information if either the second or third hyperlink is selected; and then refine the preset rules or retrain the sensitive information model to detect sensitive information based on these additional labeled emails.

9.4 Automated Controls

In yet another implementation, upon receipt of an email for which either the sender or the recipient is included in an exclusion list, the security server can scan the email for sensitive information and automatically remove (e.g., redact) sensitive information from the email prior to releasing the email for delivery to the recipient's email address. For example, in response to detecting sensitive information in the email, the security server can automatically: redact the sensitive information from the email; insert—into the email—a hyperlink to a secure webpage containing the sensitive information; and then transmit the revised email—in unencrypted form or encrypted according to a strongest encryption protocol supported by the recipient's mail client and/or incoming mail server—to the recipient address. Upon receipt of this email, the recipient can select the hyperlink within the email to access a secure web portal to view content redacted from the email or to view content of the email in its entirety.

Therefore, in this implementation, the security server can pass an email with content that the security server has determined to not be sensitive to the designated recipient of the email if the email is not subject to the minimum encryption protocol assigned to the sender domain, thereby permitting the recipient to quickly access non-sensitive information within her mail client (e.g., despite limited security options) while also permitting the recipient to access sensitive information from the original email through a more secure venue (e.g., a secure web portal). The security server can also implement this process under supervision of the administrator and/or the sender, such as in response to manual selection of content from the original email to serve to the recipient through the more secure venue.

9.5 Rule Refinement

As described above and shown in FIGS. 2 and 3, the security server (or affiliated computer system) can refine the rules or the sensitive information model with which the security server detects possible sensitive information in emails according to responses provided by senders and/or the administrator when such emails are flagged by the security server. In one example, the security server compares content contained in the email to formats defined in a sensitive information model to detect sensitive information in an email, as described above. If the security server detects sensitive information and either the sender or recipient is listed on an exclusion list, the security server then prompts the administrator of the sender to enter a selection of one of: 1) confirmation of absence of sensitive information in the email and release of the email to the recipient address; 2) confirmation of sensitive information in the email and release of the email to the recipient address; and 3) confirmation of sensitive information in the email and withholding of the email from the recipient address. The security server then: writes a label—based on the selection entered by the administrator—to the email; adds the email to a training set of email labeled as either containing or not containing sensitive information; and retrains the sensitive information model on this training set, including the email and the label applied to the email.

However, the security server can implement any other method or technique to refine rules or the sensitive information model for detecting sensitive information in an email outbound from the sender domain. Furthermore, the security server can implement similar methods and techniques to check emails—for which neither the sender nor the recipient is listed on an exclusion list—for sensitive information and to selectively involve a human (e.g., an administrator, the sender) to confirm transmission of such emails to their recipients.

10. Outgoing Mail Server

In one variation, Blocks of the method S100 described above are executed directly by the sender's outgoing mail server. However, one or more Blocks of the method S100 can be executed by the sender's mail client, the sender's outgoing mail server, by an external MTA, or any other machine or server between the sender's computing device and the recipient's computing device. The security server can also interface with another internal or external server or database to execute various Blocks of the method S100.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A method for end-to-end encryption of electronic mail comprising:
   receiving a first email encrypted according to a first encryption protocol, the first email sent by a sender at a first domain and designating a first recipient address at a second domain;
   in response to a recipient exclusion list including the first recipient address:
      accessing a first set of encryption protocols supported by a first recipient mail client at the first recipient address;
      encrypting the first email according to a second encryption protocol, in the first set of encryption protocols, less robust than the first encryption protocol; and
      transmitting the first email, encrypted according to the second encryption protocol, to the first recipient address; and
   receiving a second email encrypted according to a third encryption protocol, the second email sent by the sender at the first domain and designating a second recipient address at a third domain; and
   in response to the recipient exclusion list excluding the second recipient address:
      accessing a second set of encryption protocols supported by a second recipient mail client at the second recipient address;
      in response to the second set of encryption protocols excluding the third encryption protocol:
         generating a notification email comprising a link to a webpage containing content of the second email; and
         transmitting the notification email to the second recipient address; and
         in response to selection of the link at the second recipient mail client executing on a computing device, serving the webpage containing content of the second email to a web browser executing on the computing device.

2. The method of claim 1, further comprising, in response to the second set of encryption protocols including the third encryption protocol, transmitting the second email, encrypted according to the third encryption protocol, to the second recipient address.

3. The method of claim 1:
wherein generating the notification email comprising the link to the webpage containing content of the first email comprises generating the notification email comprising the link to the webpage containing content of the first email and an encryption opt out option; and further comprising:
in response to selection of the encryption opt out option, serving an electronic contract for authorizing less robust encryption of inbound emails, sent from the first domain to the second recipient address and for assuming liability by a recipient associated with the second recipient address for data loss for inbound emails from the first domain to the second recipient address; and in response to execution of the electronic contract, appending the recipient exclusion list with the second recipient address.

4. The method of claim 3:
wherein appending the recipient exclusion list with the second recipient address comprises appending the recipient exclusion list with the second recipient address at a first time; and further comprising:
at a second time succeeding the first time, receiving a third email encrypted according to a fourth encryption protocol, the third email sent by the sender and designating the second recipient address; and in response to the recipient exclusion list including the second recipient address:
encrypting the third email according to a fifth encryption protocol, in the second set of encryption protocols, less robust than the fourth encryption protocol; and transmitting the third email, encrypted according to the fifth encryption protocol, to the second recipient address.

5. The method of claim 1, wherein transmitting the first email, encrypted according to the second encryption protocol, to the first recipient address comprises:
scanning the first email for sensitive information;
in response to detecting sensitive information in the first email:
withholding transmission of the first email to the first recipient address; and
serving a notification to the first sender indicating presence of sensitive information in the first email and comprising a prompt to confirm transmission of the first email to the first recipient address; and
in response to receiving confirmation from the sender, transmitting the first email, encrypted according to the second encryption protocol, to the first recipient address.

6. The method of claim 1, wherein encrypting the first email according to the second encryption protocol comprises:
decrypting the first email;
scanning the first email for malware;
inserting an email footer indicating encryption of the first email into the first email; and
encrypting the first email according to the second encryption protocol.

7. A method for end-to-end encryption of electronic mail comprising:
during a first time period:
receiving a first email encrypted according to a first encryption protocol, the first email sent by a sender and designating a recipient address; and
in response to receiving the first email and in response to a recipient exclusion list excluding the recipient address:
accessing a set of encryption protocols supported by a recipient mail client at the recipient address;
in response to the set of encryption protocols excluding the first encryption protocol:
generating a notification email comprising a link to a webpage containing content of the first email and an encryption opt out option; and
transmitting the notification email to the recipient address;
in response to selection of the link at the recipient mail client executing on a computing device, serving the webpage containing content of the first email to a web browser executing on the computing device; and
in response to selection of the encryption opt out option within the webpage, updating the recipient exclusion list to include the recipient address; and
during a second time period succeeding the first time period:
receiving a second email encrypted according to a second encryption protocol, the second email sent by the sender and designating the recipient address; and
in response to receiving the second email and in response to the recipient exclusion list including the recipient address:
encrypting the second email according to a third encryption protocol, in the set of encryption protocols, less robust than the second encryption protocol; and
transmitting the second email, encrypted according to the third encryption protocol, to the recipient address.

8. The method of claim 7:
wherein receiving the first email sent by the sender and designating the recipient address comprises receiving the first email sent by the sender at a first domain and designating the recipient address at a second domain; and wherein appending the recipient exclusion list with the recipient address in response to selection of the encryption opt out option within the webpage comprises:
in response to selection of the encryption opt out option within the webpage, serving an electronic contract for authorizing less robust encryption of inbound emails, sent from the first domain to the recipient address, and for assuming liability by a recipient associated with the recipient address for data loss for inbound emails from the first domain to the recipient address; and
in response to execution of the electronic contract, appending the recipient exclusion list with the recipient address.

9. The method of claim 7:
further comprising, during the first time period, in response to a recipient, associated with the recipient address, withholding selection of the encryption opt out option, withholding appending of the recipient exclusion list with the recipient address; and
further comprising, during the second time period, in response to the recipient exclusion list excluding the recipient address and in response to the set of encryption protocols excluding the second encryption protocol:
   generating a second notification email comprising a second link to a second webpage containing content of the second email and a second encryption opt out option; and
   transmitting the second notification email to the recipient address.

10. The method of claim 7, further comprising, during the first time period, in response to the recipient exclusion list excluding the recipient address and the set of encryption protocols including the first encryption protocol, transmitting the first email, encrypted according to the first encryption protocol, to the recipient address.

11. The method of claim 7, wherein transmitting the second email, encrypted according to the second encryption protocol, to the recipient address comprises:
   scanning the second email for sensitive information; and
   in response to detecting a set of sensitive information in the second email:
      redacting the set of sensitive information from the second email;
      inserting a second hyperlink to a second secure webpage, containing the set of sensitive information, into the second email; and
      transmitting the second email, encrypted according to the second encryption protocol, to the recipient address.

12. The method of claim 7, wherein encrypting the second email according to the third encryption protocol comprises, in response to the second encryption protocol exceeding robustness of a maximum encryption protocol included in the set of encryption protocols:
   decrypting the second email; and
   encrypting the second email to the maximum encryption level supported by the recipient mail client.

13. The method of claim 7:
   wherein receiving the first email sent by the sender comprises receiving the first email sent by the sender at a sender address at a first domain; and
   further comprising, in response to a sender exclusion list including the sender address, passing the first email unchanged to the recipient address, the sender exclusion list specifying individual sender addresses within the first domain excluded from sending encrypted emails.

14. The method of claim 13, further comprising, in response to the sender exclusion list excluding the sender address and in response to a maximum encryption level supported by the recipient mail client exceeding the first encryption protocol:
   encrypting the first email to a fourth encryption protocol more robust than the first encryption protocol; and
   transmitting the first email encrypted according to the fourth encryption protocol to the recipient address.

15. A method for end-to-end encryption of electronic mail comprising:
   receiving a first email encrypted according to a first encryption protocol, the first email sent by a sender at a first domain and designating a first recipient address at a second domain;
   in response to receiving the first email:
      accessing a recipient exclusion list associated with the first domain; and
      in response to the recipient exclusion list including the first recipient address:
         accessing a first set of encryption protocols supported by a first recipient mail client at the first recipient address;
         encrypting the first email according to a second encryption protocol less robust than the first encryption protocol, the second encryption protocol included in the first set of encryption protocols; and
         transmitting the first email, encrypted according to the second encryption protocol, to the first recipient address;
   receiving a second email encrypted according to the first encryption protocol, the second email sent by the sender at the first domain and designating a second recipient address at a third domain; and
   in response to receiving the second email and in response to the recipient exclusion list excluding the second recipient address:
      accessing a second set of encryption protocols supported by a second recipient mail client at the second recipient address; and
      in response to the second set of encryption protocols including the first encryption protocol, transmitting the second email, encrypted according to the first encryption protocol, to the second recipient address.

16. The method of claim 15, further comprising, in response to the second set of encryption protocols excluding the first encryption protocol:
   generating a notification email comprising a link to a webpage containing content of the second email and an encryption opt out option;
   transmitting the notification email to the second recipient address;
   in response to selection of the link at the second recipient mail client executing on a computing device, serving the webpage containing content of the second email to a web browser executing on the computing device; and
   in response to selection of the encryption opt out option within the webpage, appending the recipient exclusion list with the second recipient address.

17. The method of claim 16, wherein appending the recipient exclusion list with the second recipient address in response to selection of the encryption opt out option within the webpage comprises:
   in response to selection of the encryption opt out option within the webpage, serving an electronic contract for authorizing less robust encryption of inbound emails, sent from the first domain to the recipient address, and for assuming liability by a recipient associated with the recipient address for data loss for inbound emails from the first domain to the recipient address; and
   in response to execution of the electronic contract, appending the recipient exclusion list with the recipient address.

18. The method of claim 15, wherein encrypting the first email according to the second encryption protocol comprises:
   decrypting the first email;
   inserting an email footer, indicating encryption of the first email, into the first email; and
   encrypting the first email according to the second encryption protocol.

19. The method of claim 15, wherein encrypting the first email according to the second encryption protocol less robust than the first encryption protocol comprises decrypting the first email to plain text.

20. The method of claim 15, further comprising, in response to the recipient exclusion list excluding the second recipient address and the second set of encryption protocols including a maximum encryption level exceeding the first encryption protocol:
- encrypting the second email to a third encryption protocol exceeding robustness of the first encryption protocol; and
- transmitting the second email, encrypted according to the third encryption protocol, to the second recipient address.

* * * * *